Patented Apr. 3, 1928.

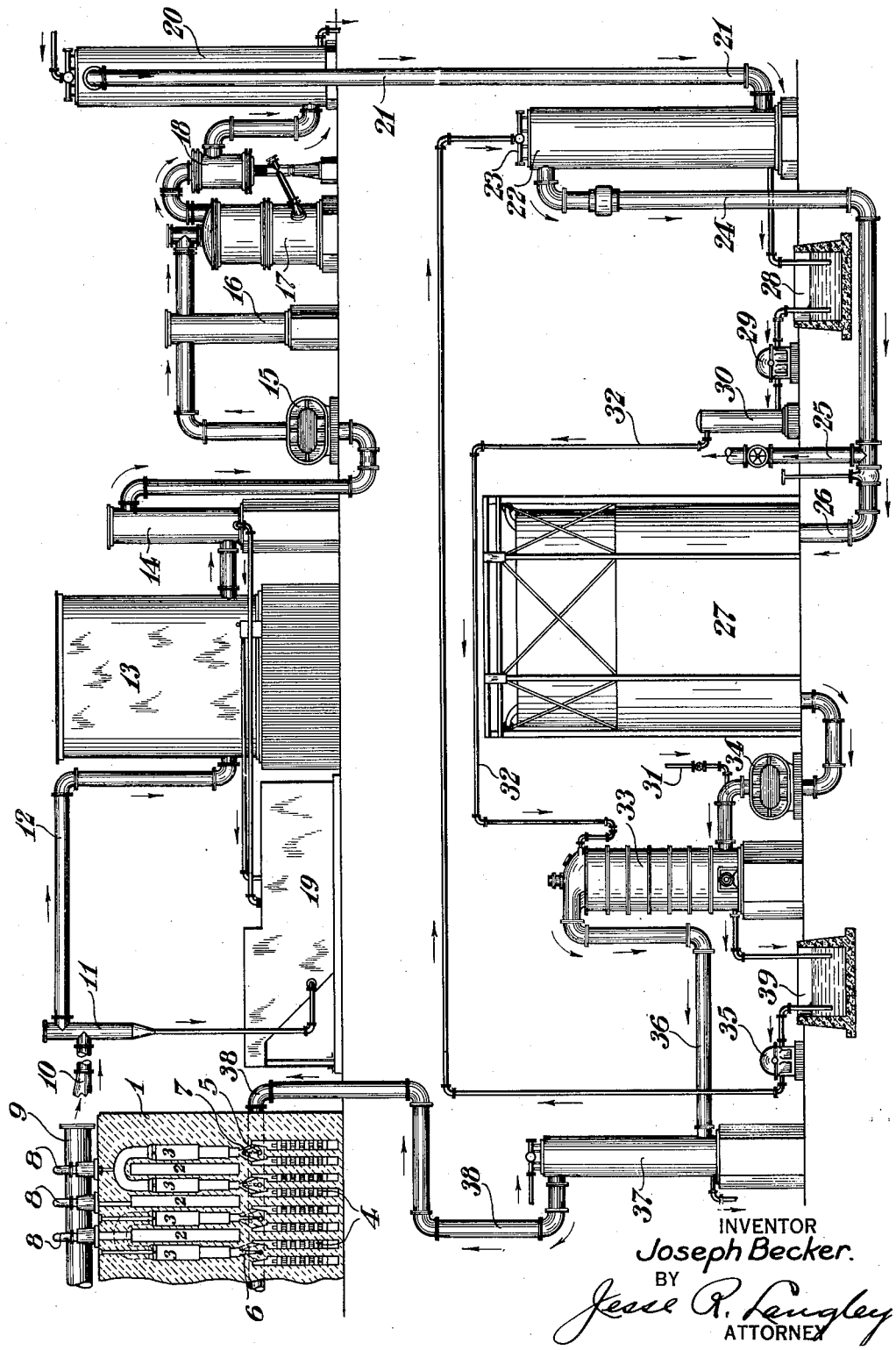

1,665,013

UNITED STATES PATENT OFFICE.

JOSEPH BECKER, OF PITTSBURGH, PENNSYLVANIA, ASSIGNOR TO THE KOPPERS COMPANY, A CORPORATION OF DELAWARE.

GAS PURIFICATION.

Application filed January 22, 1927. Serial No. 162,706.

This invention relates to the purification of gases, more particularly fuel gases such as coke oven gas, coal gas, and the like, from hydrogen sulphide and analogous acidic impurities. My invention further relates to what is known as the alkaline liquid purification process, wherein an alkaline solution, such, for example, as a solution of sodium carbonate, is circulated over the flowing gas for the removal of impurities, and through an actification stage in which impurities absorbed from said gas are volatilized and removed by a current of a gas, for rejuvenation and recirculation over the gas.

My invention is particularly adapted to the purification of fuel produced in by-product coke ovens operated in conjunction with a modern steel plant, for reasons that will be given hereinafter.

An object of my invention is to provide a regenerative process of gas purification wherein the necessity of releasing noxious gas into the atmosphere is avoided.

A further object of my invention is to provide a process whereby noxious constituents removed from fuel gas are caused to be burned to innocuous products.

A still further object of my invention is to provide a process of regenerating fouled alkaline absorptive liquid previously used to remove hydrogen sulphide from gas at a minimum of expense and nuisance.

My invention has for further objects such other operative advantages or results as may hereinafter be found to obtain.

In the so-called alkaline liquid purification process, as described and claimed in U. S. Patents Nos. 1,389,980 to C. J. Ramsburg, and 1,390,037 to D. L. Jacobson, hydrogen sulphide and analogous acidic impurities are removed from flowing gas by means of a solution of from 1 to 3% of sodium carbonate. Said solution is recirculated through a cycle comprising the aforesaid absorption stage and an actification stage. In the latter stage, the absorbed impurities are removed by subjecting the fouled solution to a current of air. The disposal of hydrogen sulphide-laden "actifier air" is at times a problem, especially in or near residential districts. Practically all plants producing a large amount of gas, purified in this way, require some adequate means of disposal of such actifier air.

The various schemes which have been proposed for such disposal are, in general, more available in gas plants than in coke plants, especially those operating for and with steel plants. No producers or water gas sets are, as a rule, available for disposing of hydrogen-sulphide-laden air, and the combustion of such air under boilers may not be convenient or practicable in certain cases.

On the other hand, ordinary steel plant practice only requires the purification of fuel gas to a hydrogen sulphide content of about 100 grains per 100 cu. ft. of gas. Moreover, it is general practice to use from 35 to 40% of the total gas produced as fuel for underfiring the by-product coke ovens. Such conditions are particularly adapted to the employment of my process.

According to my invention, I purify coke oven gas or the like in the usual manner, after removing tar and ammonia, by contact with an alkaline solution of the character described. I then accomplish an actification or regeneration of the fouled solution by passing through said fouled solution that portion of the purified gas required as fuel for the carbonizing apparatus. As this portion of the gas is to be burned, it is safe and desirable to transfer the impurities to it in this manner.

In order that my invention may be clearly set forth and understood, I will now describe, with reference to the accompanying drawing, the preferred manner in which my invention is embodied and accomplished.

In the drawing, the single figure is a more or less diagrammatic view of a portion of a coke-oven battery, with means for collecting, washing and purifying the gas produced therein.

Referring to the figure, the reference character 1 indicates generally a portion of a battery of coke ovens comprising carbonizing chambers 2, heating flues 3, and regenerators 4. When as in the present instance, a portion of the gas evolved from distillation of the carbonaceous material within chambers 2 is to be used as fuel for underfiring the battery, the said gas is introduced into the flues 3 from ducts 5 through nozzles 6, and is burned by air entering through ducts 7 and preheated by passage through the regenerators 4. Products of combustion serve to heat alternate regenerators not then used as preheaters, and reversals are made to preserve a proper heat exchange and regeneration.

By means of the heat supplied from the flues 3, charges of carbonaceous material within the chambers or ovens 2 are distilled. The gases evolved escape through ascension pipes 8 into a hydraulic collecting main 9, and pass through a crossover main 10, through a pitch trap 11 and a main 12 into a primary cooler 13, where they are cooled by indirect contact with water. The relatively cool gas is now drawn through a tar extractor 14 by an exhauster 15, and passes through a preheater 16 into a saturator 17, filled with sulphuric acid for removal of ammonia, and then through an acid separator 18. Tarry and ammoniacal condensates removed from the gas drain into a hot drain tank 19. After leaving the separator 14, the gas is now free of tar and ammonia, and is at a temperature of about 110–135° F.

Since the purification of gas at such high temperatures results in decreased absorber efficiency and increased consumption of alkali, I prefer to cool said gas prior to purification thereof. For this purpose, the gas, after leaving the separator 18, is passed through a cooler 20, where it is reduced to a temperature of 77° F. or thereabouts, by direct contact with cooling water. Under some conditions, removal of light oils may be accomplished after the gas leaves the final cooler and prior to purification thereof. The gas is then led through a main 21 into an absorber 22, filled with suitable contact devices, and is washed in counter-current with a 1 to 3% solution of sodium carbonate introduced through sprays 23.

The gas leaves the absorber 22 relatively free from acidic constituents. For steel plant practice, gas containing about 400 grains of hydrogen sulphide per hundred cubic feet, need generally only be reduced to an $H_2S$ content of about 100 grs. per hundred cu. ft. However, more complete purification of the gas not used for fuel may be effected if desired, or supplementary purification by any suitable means may be employed.

After leaving the absorber 22, the major portion of the gas passes through mains 24 and 25, to catch boxes, meters, and the like, and eventually into distribution mains. That quantity of the gas required as fuel for the ovens is withdrawn from the main stream, and passes through conduit 26 into a fuel gas holder 27. This quantity is generally from 35 to 40%, or even more, of the total gas.

According to my invention, the actification of the fouled sodium carbonate solution leaving the absorber tower 22 is accomplished by treating said solution with the gas required for fuel. In order to assist this actification, it is preferred to heat the fouled solution prior to actification. For this purpose, the fouled solution leaving the absorber 22 is collected in a sump 28 and is forced by a pump 29 through a heater 30. The heater 30 may be supplied with steam, or may be supplied with heat by heat exchange with other and warm gas, waste gas or the like. The actual temperature to which the fouled solution is heated will depend upon various factors, such as the degree of purification of the gas, the temperature of the gas, etc., but, in general, a temperature of 185° F. is preferred. Heating the fuel gas, after purification and prior to using it for actification of the fouled purification solution, is also beneficial and may be accomplished by introducing steam directly into said gas, or otherwise. Steam is introduced into the gas as required through a conduit 31.

After passing through the heater 30, the fouled solution passes through a line 32, enters the top of an actifier 33, and passes downwardly through the actifier 33, in counter-current to the rising gas. The actifier 33 is preferably of the mechanical rotor type, such as the well-known Feld scrubber, as I have found that agitation of the fouled solution during actification thereof is of especial benefit in my process, where limited volumes of gas are available for actification. However, a hurdle or static type of washer may be used as actifier.

The fuel gas, purified of all or a portion of its hydrogen sulphide and the like, is forced by a blower 34 into the lower part of the actifier 33, and passes upward therethrough, in opposite direction to the solution. In the course of this contact, the gas re-absorbs the noxious impurities carried by the solution, and emerges from the actifier 33 in highly impure state, whereas the solution is now regenerated, and passes into a sump 39, ready for absorption of impurities from further quantities of gas. For this purpose, it is recirculated by a pump 35 through the absorber 22, and thus completes the cycle. Alkali is added to the solution as need be to make up for mechanical losses, formation of fixed salts, etc.

The fuel gas leaving the actifier 33, and containing large amounts of moisture, $H_2S$, HCN, etc., passes through a main 36 into a cooler 37, where it is cooled by direct contact with water to a temperature of 77° F. or thereabouts, and then passes into a main 38, by means of which it is distributed through the ducts 5 and nozzles 6 for combustion in the flues 3. Under combustion, the noxious impurities are oxidized to inoccuous substances, and pass out with the stack gases into the atmosphere without nuisance.

The extent to which the gas is purified in the absorber 22 depends upon conditions and requirements of the particular plant. Generally the gas will contain about 400 grains of $H_2S$ per 100 cu. ft., and a purification to 100 grs. $H_2S$, per 100 cu. ft., will be required. In this instance, if 40% of the gas were required for underfiring, this gas would then leave the actifier 21 with a content of 850 grs. $H_2S$ per 100 cu. ft. However, if a purification to only 200 grs. $H_2S$ per 100 cu. ft. were required, by reason of requirements or subsequent purification means, such as oxide boxes, etc., the fuel gas would contain 700 grs. $H_2S$ per 100 cu. ft.

My invention is not limited to the purification of coke oven gas, recited above by way of example, nor to the specific sequence of purification steps employed therein, but may be variously embodied and practiced within the scope of the claims hereinafter made.

For example, the usual direct type of final cooler may be replaced by an indirect, tubular cooler, and the condensate may be run back into the purification system.

Moreover, if producer gas or other gas is used for underfiring the ovens, it may be used as actification medium without difficulty. Or any other combustible gas, such, for example, as horizontal retort gas, may be used as actification medium and be subsequently burned.

The advantages of my process will readily be seen by comparison with previous processes. The disposal of fouled actifier air is obviated, and the supplementary apparatus, such as fans and piping, required for its use are dispensed with. These advantages are particularly applicable to a plant operating in conjunction with a steel plant, but my process may be advantageously employed elsewhere, as in gas plants and the like.

A further advantage incident to the performance of my invention resides in the fact that the thermal value of the fuel gas is increased, due to the high content of hydrogen sulphide. This is by no means a negligible item.

I claim as my invention:

1. The process of gas purification which comprises washing the gas with an absorbent solution for the removal of impurities, removing said solution after contact with the gas, and regenerating it for further use by subjecting it to contact with a portion of the purified gas.

2. The process of gas purification which comprises transferring impurities from the gas to a liquid, and subsequently transferring said impurities from said liquid to a portion of the purified gas.

3. The process of gas purification which comprises transferring impurities from the gas to a liquid, transferring said impurities from said liquid to a stream of combustible gas, and igniting said gas.

4. The process of purifying coke-oven gas from hydrogen sulphide and analogous impurities which comprises subjecting said gas to contact with an alkaline solution for the removal of impurities, removing said solution, passing it for regeneration over that portion of the purified gas required for fuel for the coke ovens, and then returning it to contact with further quantities of gas.

5. The process of regenerating an alkaline solution previously used to remove hydrogen sulphide and analogous impurities from gas, which comprises passing said solution through a stream of combustible gas of relatively lower content of impurities, and then burning said gas.

6. The process of regenerating an alkaline solution fouled by contact with hydrogen sulphide and hydrogen cyanide-laden gas, which comprises subjecting said fouled solution to contact with a portion of said gas after the purification thereof, for the removal of impurities absorbed from the total gas flow, and then burning said impurity-laden portion of the gas.

7. The process of regenerating an alkaline solution fouled by contact with hydrogen sulphide and hydrogen cyanide-laden gas, which comprises heating said fouled solution and subjecting it to contact with a portion of said gas after purification thereof, for the removal of impurities absorbed from the total gas flow, and then burning said impurity-laden portion of the gas.

8. The process of treating coke-oven gas which comprises cooling the gas, removing tar and ammonia therefrom, removing acidic impurities by contact with an alkaline solution, separating that portion of the gas required for fuel from the remainder of the gas, using said fuel gas to regenerate said alkaline solution, disposing of it as fuel where sulphur is not objectionable, and finally cooling said remainder.

9. The process of regenerating an alkaline solution previously used to remove hydrogen sulphide and analogous impurities from coke oven gas, which comprises passing said solution over gas to be used as coke-oven fuel.

10. The process of regenerating an alkaline solution previously used to remove hydrogen sulphide and analogous impurities from coke oven gas, which comprises heating said solution and passing it over gas to be used as coke-oven fuel.

11. The process of regenerating an alkaline solution previously used to remove hydrogen sulphide and analogous impurities from coke oven gas, which comprises heating said solution and agitating it in the presence of gas to be used as coke-oven fuel.

12. The process of purifying gas which comprises subjecting said gas to contact with an alkaline solution for removal of acidic impurities, withdrawing said solution from contact with said gas, withdrawing and heating a portion of said gas, and subjecting said heated solution to contact with said heated gas for actification of said solution, and returning said solution to contact with further quantities of impure gas.

13. The process of gas purification which comprises transferring impurities from the gas to a liquid, and then transferring said impurities from said liquid to a stream of combustible gas.

In testimony whereof, I have hereunto subscribed my name this 20th day of January, 1927.

JOSEPH BECKER.